(12) United States Patent
Debraal et al.

(10) Patent No.: US 6,852,381 B2
(45) Date of Patent: Feb. 8, 2005

(54) INSULATED BEVERAGE OR FOOD CONTAINER

(75) Inventors: John Charles Debraal, Appleton, WI (US); John MacKay Lazar, Custer, WI (US)

(73) Assignee: Appleton Papers, Inc., Appleton, WI (US)

( * ) Notice: Subject to any disclaimer, the term of this patent is extended or adjusted under 35 U.S.C. 154(b) by 23 days.

(21) Appl. No.: 10/167,463

(22) Filed: Jun. 13, 2002

(65) Prior Publication Data

US 2003/0021921 A1 Jan. 30, 2003

Related U.S. Application Data

(60) Provisional application No. 60/298,386, filed on Jun. 18, 2001.

(51) Int. Cl.$^7$ .............................. B27N 5/02; B65D 3/06; B65D 81/38; A47J 41/00
(52) U.S. Cl. ..................... 428/34.2; 428/34.9; 428/35.7; 428/36.5; 220/592.16; 220/592.17; 220/592.18; 220/592.2; 220/592.25; 220/902; 220/903; 220/734; 229/103.11; 229/403
(58) Field of Search ................. 428/34.2, 34.9, 428/35.7, 36.5; 220/592.16, 592.17, 592.18, 592.2, 592.25, 902, 903, 734; 229/103.11, 403

(56) References Cited

U.S. PATENT DOCUMENTS 3,988,521 A  * 10/1976 Fumel et al. ............... 428/34.2
4,435,344 A     3/1984 Iioka .......................... 264/45.1
4,551,123 A  * 11/1985 Inagaki ........................ 493/108
4,626,455 A  * 12/1986 Karabedian ................ 428/34.7
4,679,724 A  *  7/1987 Inagaki ........................ 229/4.5
4,923,557 A     5/1990 Dickey ......................... 156/86
5,490,631 A     2/1996 Iioka et al. .................. 229/403
5,667,071 A  *  9/1997 Nakagoshi et al. ......... 206/455
5,840,139 A    11/1998 Geddes et al. ................ 156/79
5,952,068 A     9/1999 Neale et al. ................ 428/36.5
6,030,476 A     2/2000 Geddes et al. ................ 156/79
6,277,454 B1 *  8/2001 Neale et al. ................ 428/34.2
6,474,499 B2 * 11/2002 Donelson et al. ....... 220/592.21
6,620,281 B1 *  9/2003 Sommers ..................... 156/248

FOREIGN PATENT DOCUMENTS

EP       0 940 240 A2    9/1999
EP       1 060 879 A2   12/2000

* cited by examiner

Primary Examiner—Harold Pyon
Assistant Examiner—Chris Bruenjes
(74) Attorney, Agent, or Firm—Birch, Stewart, Kolasch & Birch, LLP

(57) ABSTRACT

An insulating beverage or food container or sleeve is produced with a foam layer disposed on an inner surface of a paper stock. A polymer shrink film layer is arranged in a position along an inside surface of the beverage container. The foam layer is sandwiched between the polymer shrink film layer and the paper stock and decreases the energy transfer between the beverage and the user's hands allowing the user to hold onto the container for an extended period of time without causing user discomfort or pain. The polymer shrink film layer is produced from a shrink film polymer having a percent shrink in the range of 30% or less, and more particularly a percent shrink range of 5 to 10%.

20 Claims, 7 Drawing Sheets

INSULATED BEVERAGE OR FOOD CONTAINER

CROSS-REFERENCE TO RELATED APPLICATIONS

The present inventors claim the benefit of U.S. Provisional Application No. 60/298,386, filed on Jun. 18, 2001, "Insulated Beverage or Food Container;" the entire contents of which are hereby incorporated by reference.

BACKGROUND OF THE INVENTION

1. Field of the Invention

The present invention relates to an apparatus and method for insulating containers and container stock material. In particular, the present invention relates to an insulated, paper-based beverage or food container or stock material having improved insulation properties and a method of producing these insulated containers or stock materials.

2. Description of the Background Art

Current standard paper cup stock permits excessive heat transfer through the wall of an insulated beverage container. Accordingly, a user's hand becomes uncomfortably or sometimes even painfully hot when excessive heat transfer is permitted through the container wall. This may require the user to be inconvenienced by having to release the container due to the excessive heat of the container's contents. Thus, such containers have a low hold time. An analogous but opposite situation can occur with very cold beverages, where heat from a user's hand is transferred rapidly to the contents of the container.

U.S. Pat. No. 4,435,344 to Ioka describes a method for producing an insulating composite paper container having a body member and a bottom member. The body member is formed of paper coated or laminated with a thermoplastic synthetic resin film. A surface of the body member is then heated to form a foamed polyethylene heat-insulating layer on either or both of the inner and outer surfaces of the container's body member. The heat-insulated body member is then attached to the bottom member.

U.S. Pat. Nos. 6,030,476 and 5,840,139 to Geddes et al. describe a method for producing insulating beverage containers or cups, stock material and containers made therefrom. A stock material includes a base layer, an insulating layer formed on a portion of the base layer, and a printed pattern/mineral oil applied to the insulating layer. The insulating layer is formed using a thermoplastic synthetic resin film. Also, U.S. Pat. No. 6,030,476 describes a polyethylene foam on the outside surface of the paper cup.

European Patent Application EP 0940240 A2 describes a heat insulating paper cup with targeted insulation in areas where printed matter exists. The body member of the cup is coated on its outside surface with a foamable synthetic resin and on its inside surface with a synthetic resin laminate to prevent liquid penetration. The bottom panel member is optionally coated on its upper surface with a foamed or an unfoamed synthetic resin. Printed matter is provided prior to foaming of the synthetic resin on the outer surface of the cup with water-based ink. Further, the low density polyethylene is foamed by vaporizing the water contained in the paper stock.

European Patent Application EP 1060879 A2 describes a heat insulating paper cup having a body member partially or fully coated on its outside surface with a foamed low density polyethylene and coated on its inside surface with an unfoamed modified low density polyethyelene.

However, the present inventors have determined that the devices and methods of the background art suffer from the following disadvantages. Other designs sacrifice the outside printability of the cup to provide insulation or do not provide adequate insulation properties.

The background art has not yet achieved insulated paper stock that is capable of effectively impeding heat transfer between the contents of the container and the exterior. In addition, adequate thermal insulation is not achieved from the background art in a manner that is cost effective.

SUMMARY OF THE INVENTION

The present invention overcomes the shortcomings associated with conventional devices and methods, and achieves other advantages not realized by conventional devices and methods.

It is an aspect of the present invention to provide an insulated beverage container, sleeve or stock material that reduces the energy transfer through a container wall, and offers increased functionality and usefulness.

It is an aspect of the present invention to provide a container, sleeve, or stock material having superior hold times and pre-disposed to high quality printing and graphics.

The present invention is a recognition, in part, that the ability to produce blank paper cups, sleeves or stock material that can be printed/graphically enhanced is desirable. This invention permits a superior insulating cup product to be made from standardized manufacturing processes.

These and other aspects of the present invention are accomplished by an insulated container stock material comprising a paper stock layer; a foam layer disposed along an interior surface of the paper stock layer; and a polymer shrink film layer having a percent shrink of 30% or less.

These and other aspects of the present invention are also accomplished by an insulated container comprising a container wall having an exterior surface and an interior surface; a bottom portion engaging the container wall along a lower side portion thereof; a paper stock layer arranged along the exterior surface of the container wall; a foam layer arranged along the interior surface of the container wall; and a polymer shrink film layer having a percent shrink of 30% or less.

These and other aspects of the present invention are also accomplished by an insulated container comprising a container wall having an exterior surface and an interior surface; a bottom portion engaging the container wall along a lower side portion thereof; a paper stock layer arranged along the exterior surface of the container wall; a foam layer arranged along the interior surface of the container wall; and a polymer shrink film layer, the foam layer being sandwiched between the polymer shrink film and the paper stock layer.

These and other aspects of the present invention are also accomplished by an insulated food or beverage container sleeve comprising a paper stock layer having an interior surface; a foam layer disposed along the interior surface of the paper stock layer; and a polymer shrink film layer having a percent shrink of 30% or less, the foam layer being sandwiched between the paper stock layer and the polymer shrink film layer. However, the shrink film layer may not be necessary in all embodiments of the present invention, e.g., a beverage container sleeve will not require a shrink film layer.

These and other aspects of the present invention are also accomplished by a method of producing an insulated container, comprising the steps of providing a paper cupstock having a container wall for surrounding an interior space, a bottom portion, and a paper stock layer arranged along an exterior surface of the container wall; mixing a blowing agent into a foamable polymer layer; forming a foam layer along an inside surface of the interior space; adhering a polymer shrink film layer to the foam layer; and heat treating the container to shrink the polymer shrink film layer between a percent shrink range of 30% or less.

These and other aspects of the present invention are also accomplished by a method of producing an insulated food or beverage container or sleeve, comprising the steps of providing an insulated container or sleeve having an interior space, the interior space including a polymer shrink film layer and a foam layer along an interior surface thereof; and heating the interior surface to shrink the polymer shrink film layer; and removing wrinkles along the foam and polymer shrink film layers during the heating step reducing or eliminating a wrinkling effect in the interior space.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention is directed toward an insulated beverage or food container, cup or sleeve; the container stock material; and a method of producing insulated beverage or food containers or stock materials that utilize a polyethylene foam layer extruded or laminated to a surface of a food or beverage paper stock. The present invention is described in greater detail hereinafter with reference to the accompanying drawings.

Figure 1:
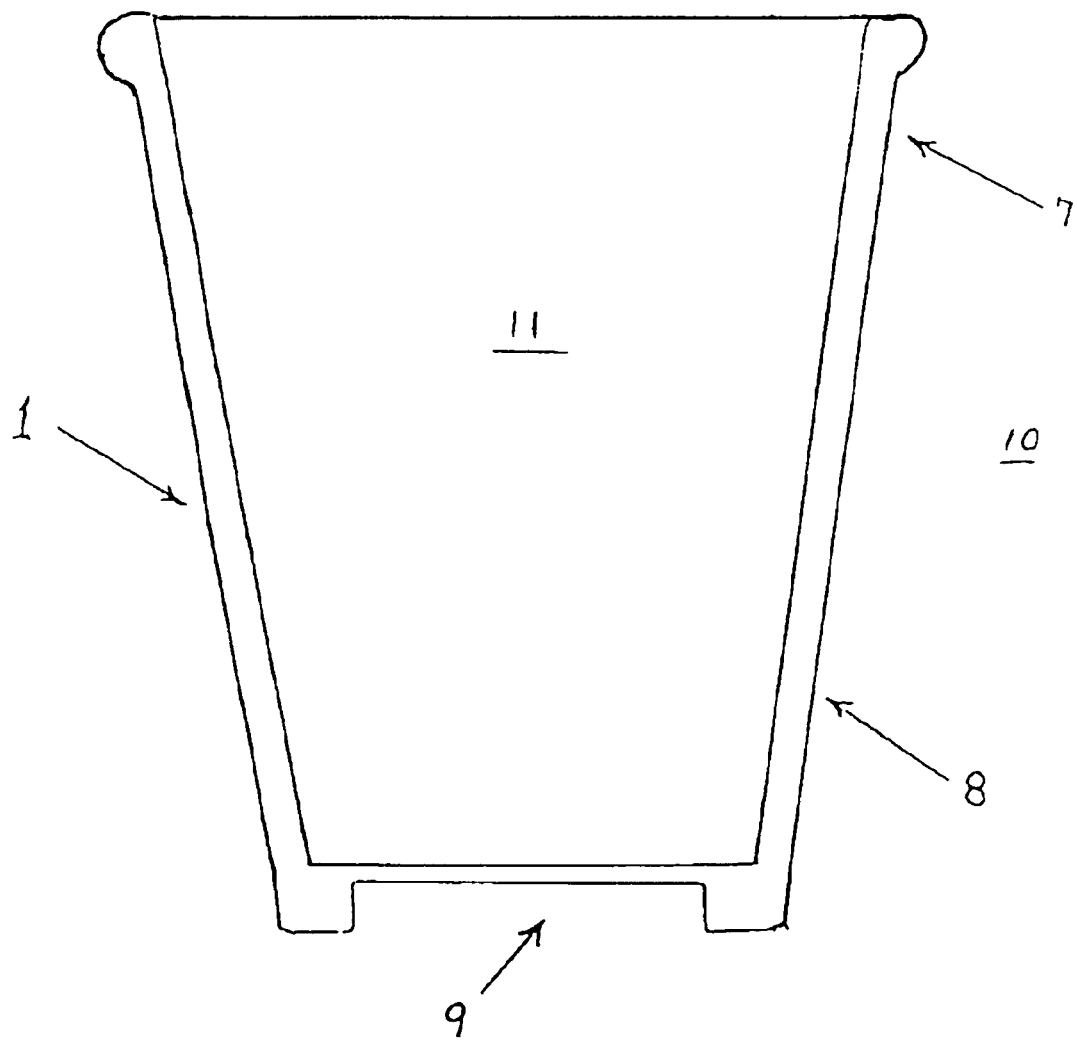
FIG. 1 is a side cross-sectional view of an insulated beverage or food container according to the present invention.

FIGS. 2 through 6 are cross-sectional views of an insulated beverage container wall 11 according to various embodiments of the present invention. One of skill in the art will appreciate that an insulated container 10 as shown in FIG. 1 can readily incorporate any of the beverage container walls depicted in FIGS. 2 through FIG. 6. While the following description is directed toward a cup, the techniques of this invention can be applied to any number of containers or surfaces, for instance a beverage container, insulating beverage sleeve or stock material can be constructed from any of the embodiments shown in the accompanying drawings.

FIG. 1 is a side cross-sectional view of an insulated beverage container 10 according to the present invention. The insulated beverage container includes a container wall 1 having an upper side portion 7, a lower side portion 8 and a bottom portion 9. A beverage containing space 11 is formed between the container wall's 1 upper side portion 7, lower side portion 8 and bottom portion 9.

As aforementioned, current standard paper cup stock allows excessive heat to transfer through the wall of the container. This results in a user's hand becoming uncomfortably or sometimes even painfully hot or cold when grasping a hot or cold container. A quantitative measurement of the ability of a paper stock to withstand heat transfer between the beverage containing space and the outermost surface of the container is often referred to as hold time. It will be appreciated that the present invention significantly improves the hold time of paper-based stock beverage containers over the related art.

The present invention utilizes a gas containing film adhered or selectively adhered to the surface of a paper stock. The gas containing film layer provides resistance to heat transfer through the container wall 1. The present invention provides an insulating container construction and a method of producing this construction which reduces the energy transfer through the container wall, providing increased functionality and usefulness.

Figure 2:
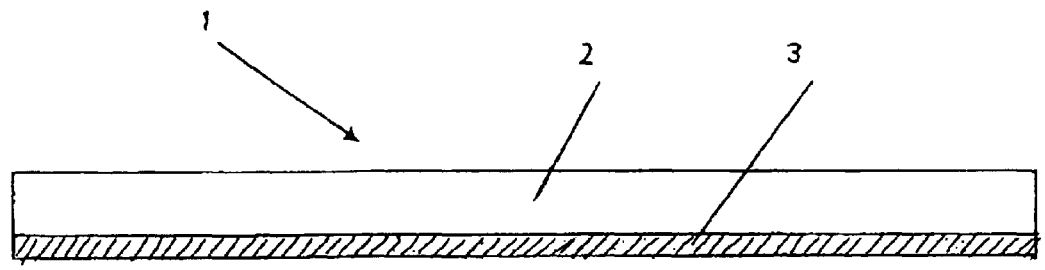
FIG. 2 is a cross-sectional view of an insulated beverage container wall or sleeve according to the present invention.

FIG. 2 is a cross-sectional view of an insulated beverage container wall or sleeve 1 according to a first embodiment of the present invention. A beverage container wall or sleeve 1 includes a paper stock 2, and an extruded or laminated foam layer 3. The paper stock 2 provides structural rigidity and forms the desired shape of the container 10 or a portion of a sleeve wall. The extruded or laminated foam layer 3 is adhered to an inner surface (e.g., facing the beverage containing space 11) of the paper stock 2 and performs the function of a gas containing film layer. The foam layer 3 is designed to provide thermal insulation properties to the container.

The paper stock 2 is standard paper used for making beverage cups and other food containers. The paper stock 2 may be chosen with a thickness that provides optimized physical characteristics for cup construction. Important physical characteristics include fold strength, stiffness, tear and tensile strength.

A desired paper thickness is chosen such that the resultant thickness of the finished cup wall 1 does not negatively impact converting, handling or finished cup properties. A typical paper stock 2 for beverage and food containers range from 10 to 40 mils in a paper stock 2 thickness, and more particularly from 10 mils to 26 mils in thickness in a preferred embodiment for the present invention. Where the present invention is applied to an insulating beverage sleeve, the paper stock 2 may be chosen with a thickness which provides the proper physical characteristics such as strength for constructing a sleeve surrounding a beverage container 10 such as that shown in FIG. 1.

Important physical characteristics include fold strength, stiffness, tear and tensile strength. The paper thickness is chosen such that the resultant thickness of the sleeve and cup wall does not negatively impact handling, distribution or become cumbersome to the end user. Additional criteria affecting paper stock selection includes appearance and cost. A smooth, bleached-white paper may be chosen to enhance the print quality and the appeal of the cup, or a brown kraft stock may be chosen for economy. Applicable paper suitable for sleeve stock ranges from 2 mils to 10 mils for the application to an insulating beverage sleeve.

The extruded or laminated foam layer 3 is applied to the paper stock 2 as an extrusion or lamination. The purpose of the extruded or laminated foam layer 3 is to provide thermal insulation properties, and to contain liquids. The extruded or laminated foam layer 3 can also be used as a barrier to moisture transmission and further aids in seam sealing during container construction. In the case of an insulating beverage sleeve, the foam layer 3 is a gas containing layer that provides resistance to heat transfer through the sleeve wall.

The extruded or laminated foam layer 3, although not limited to, can be formed from any of the following exemplary materials: high density polyethylene (HDPE), low density polyethylene (LDPE), linear low density polyethylene (LLDPE), orientated polypropylene (OPP), etc. HDPE and LDPE are desirable materials in a preferred embodiment of the present invention. Although not necessary, additional foam polymers may include and/or be formed from PEFSs, LDPEs or HDPEs that are not tensioned or stretched during manufacturing.

Additives may also be included to enhance various material properties or to aid in the manufacturing process. These additives include, but are not limited to, any of the following exemplary additives: ethylene vinyl acetate (EVA), ethylene vinyl alcohol (EVOH), and plasticizers.

The foam layer 3 is attached to the paper stock uniformly during the manufacturing process. The gases trapped within the film of the foam layer 3 impart a high level of thermal insulation to the container wall. An important aspect of the gas containing foam layer 3 is to provide resistance to energy transfer. The amount of trapped gas is variable and depends upon a specified volume that will render the exterior of the container comfortable to hold for an average user. Therefore, the required amount of trapped air will generally vary according to the intended use of the container.

For instance, a container used to serve coffee (normally 190° F.) will need more resistance to energy flow than a similar container used to serve a relatively cool cup of soup (normally 165° F.). An additional benefit to the insulating layer is the ability of the container to keep the food or beverage at its serving temperature for a longer period of time.

A foam layer 3 can be either laminated to or extruded onto the paper stock 2. When the foam layer 3 is laminated to the paper stock layer 2, a gas containing film such as CA-20 manufactured by Sealed Air Corporation or another may be used. When the film is extruded onto the paper stock 2 a blowing agent is mixed into the polymer prior to extrusion. The incorporated blowing agent creates gas pockets within the film during the extruding process. The extrusion method offers the additional advantage of creating the product in one operational step.

The insulating foam layer 3 is preferably between 2 and 30 lbs/3300 ft$^2$, and more preferably between 5 and 15 lbs/3300 ft$^2$. The density of the film is preferably between 1.0 and 3.0 lbs/ft$^3$. The thickness of the insulating gas containing foam layer 3 is preferably between 5 and 30 mils, and more preferably between 10 and 20 mils. The foam layer 3 can be a gas containing film layer formed from a continuous single layer or lamination of films and foam.

Polymer Shrink Films

Figure 3:
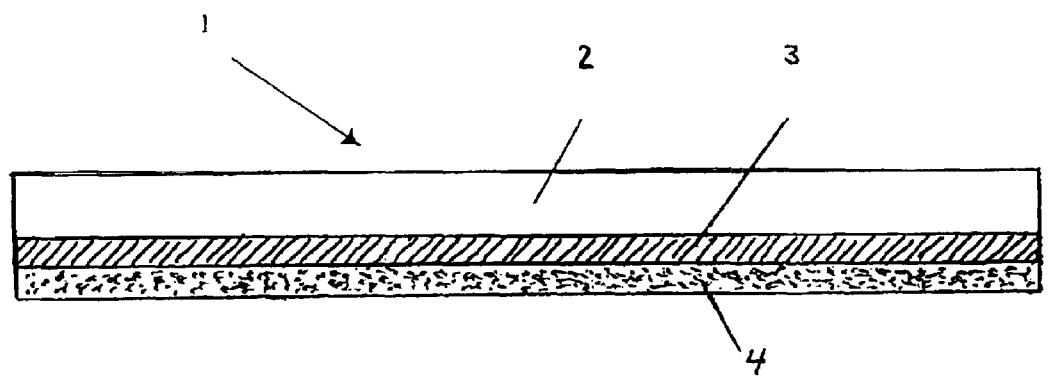
FIG. 3 is a cross-sectional view of an insulated beverage container wall according to a first embodiment of the present invention.

FIG. 3 is a cross sectional view of a container wall according to a first embodiment of the present invention. A polymer shrink film layer 4 is extruded, laminated, or coated to the foam containing layer 3, e.g. in a position between the beverage containing space 11 and the foam containing layer 3 in a container 10. The foam layer 3 is therefore interposed between the paper stock 2 and the polymer shrink film layer 4. The polymer shrink film layer 4 will hereinafter be referred to as a PE layer 4. The PE layer 4 can be used as a barrier against moisture transmission and aids in seam sealing during container construction.

In a preferred embodiment, the foam layer 3 is first formed and then it is melt extruded, laminated or melt fused to the surface of the paper stock 2. The residual moisture held within the paper stock 2 which is characteristically relied upon in the related art, is not relied upon as the mechanism for creating the foam layer 3. The foam can also be extruded to the paper stock 2, but in each instance the foaming is created by mixing a blowing agent into the polymer prior to extrusion or foam creation. The incorporated blowing agent creates gas pockets within the film during the extruding process. The extruded method offers the advantage of directly creating the product in one operational step.

The foam layer 3 can also be treated in order to accept or conform with various printing inks. The foam layer 3 can be treated by various means well known in the industry such as, but not limited to: corona treatment, flame treatment, ozone treatment, coatings, etc.

Figure 4:
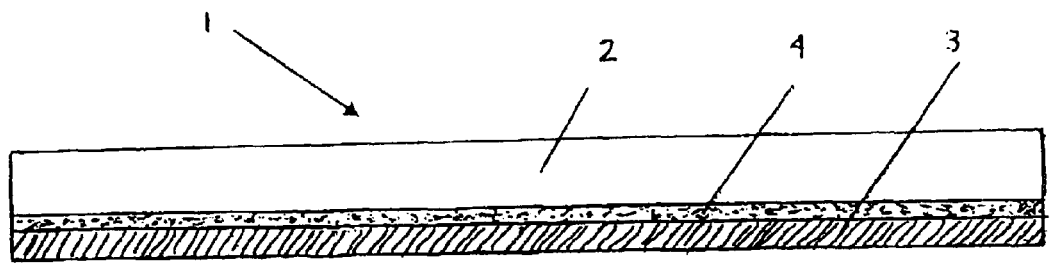
FIG. 4 is a cross-sectional view of an insulated beverage container wall according to a second embodiment of the present invention.
Figure 5:
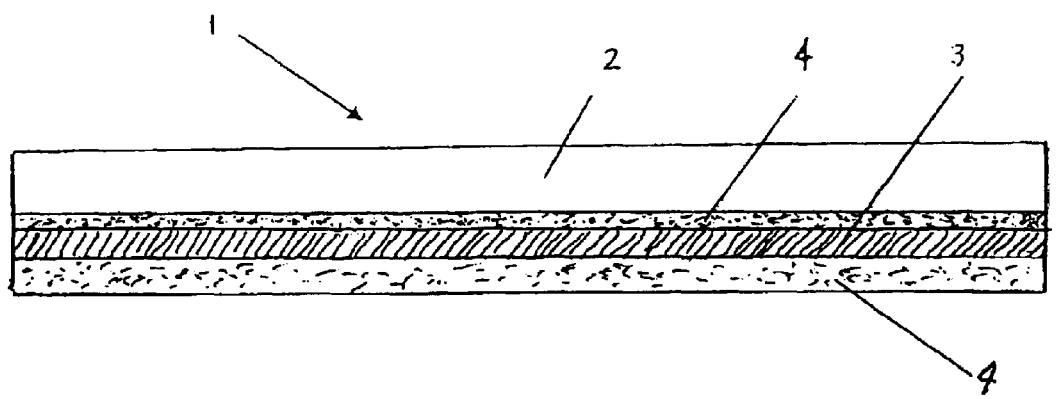
FIG. 5 is a cross-sectional view of an insulated beverage container wall according to a third embodiment of the present invention

FIG. 4 is a cross sectional view of a container wall according to a second embodiment of the present invention. A PE layer 4 is extruded, laminated, or coated in a position interposed between the foam layer 3 and the paper stock 2. However, PE layer 4 can also be used as a barrier against moisture transmission and aids in seam sealing during container construction. As seen in FIG. 5, the foam layer 3 can also be sandwiched between two PE layers 4, e.g. an innermost PE layer is adhered directly to the paper stock layer 2 in a third embodiment.

The PE layer(s) 4, although not limited to, can be formed from any of the following exemplary materials: high density polyethylene (HDPE), low density polyethylene (LDPE), linear low density polyethylene (LLDPE), orientated polypropylene (OPP), etc. HDPE and LDPE are desirable materials in a preferred embodiment of the present invention. Some additional and applicable shrinkable thermoplastics are PVC, PTFE, FEP, PVDF, PET, LDPE, LLDPE, HDPE and polyolefin, that may be readily incorporated into the claimed invention.

The PE layer(s) 4 can be manufactured to develop a property called shape memory. When the PE layer(s) 4 are subject to axial tension and stretching during manufacture or heated while under tension and then allowed to cool, the PE layer(s) 4 develop shape memory. Shape memory causes the PE layer(s) to shrink, e.g. the polymer molecules relax to their original shape, when reheated. The present inventors have determined that the shape memory of particular PE layer(s) can be used advantageously in conjunction with paper stock materials to produce polymer shrink film layers 4 that reduce and/or eliminate a wrinkling effect discussed in greater detail hereinafter.

Additives may also be included to enhance various material properties or to aid in the manufacturing process. These additives include, but are not limited to, any of the following exemplary additives: ethylene vinyl acetate (EVA), ethylene vinyl alcohol (EVOH), and plasticizers.

Figure 6:
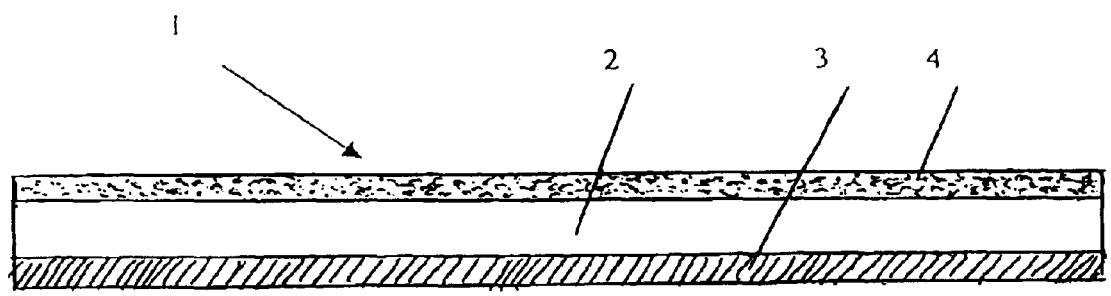
FIG. 6 is a cross-sectional view of an insulated beverage container wall according to a fourth embodiment of the present invention.

FIG. 6 is a cross sectional view of a container wall according to a fourth embodiment of the present invention. A PE layer 4 has been applied to an outside surface or interior surface, e.g. a surface opposite to the foam layer 3 with respect to the paper stock 2. The PE layer 4 can be laminated, extruded or coated onto the paper stock surface. The PE layer 4 also serves a barrier to the beverage or food placed within the container, and can also serve as a sealing mechanism. Alternatively, the PE layer 4 could be applied as the innermost layer, e.g., closest to the beverage containing space 11. Further, additional PE layers 4 and/or foam layers 3 can be applied to either the inside or outside surfaces of the container wall 1 as desired to add additional barriers and/or thermal resistance to the liquid or heat sealed within (or excluded from) the container. The PE layer 4 can be applied directly to the paper stock 2 or indirectly over the foam 3.

A preferred coating material for additional coating layers for the present invention is an expanding foam. This expanding foam material is encapsulated isobutane in a polymeric shell. The expanding foam capsules are added to the coating with a small, e.g., unexpanded, diameter. Upon drying the foam and increasing the heat to a certain temperature, the encapsulated isobutane changes from a liquid to a gas and the polymeric shell expands with the appropriate volumetric change.

The resulting expanded spheres or cavities have a very low density and low thermal conductivity. Expanded foam also has the advantage of creating a rough surface that will further reduce the contact area between layers in the container wall and therefore reduce heat transfer. A thin layer of the expanding foam coated onto the paper stock exterior is especially useful for roughening or for texturing to aid in gripping the container.

A preferred coating is a foamed coating. Foamed coating is a coating that utilizes entrained air. The dispersed air in the coating provides a low coating density and low thermal conductivity. The foamed coating also accepts and is easily processed to achieve surface modification. The foamed coating will therefore allow a rough or perforated surface to be created through the use of an embosser, press or other mechanical device.

Foam coating also has the ability to be used as a single coating, or may also act as the insulating coating and a printing coating simultaneously, depending on the application and desires of the end user.

The selected coating materials for the insulating coating are dispersed in an aqueous system with additional components added as necessary to provide ease of processing and application. Pigments such as silica, calcium carbonate, clay and synthetic pigments may be also used.

Binders are included to adhere the coating to the paper substrate. Typical binders may be selected from, but are not limited to, polyvinyl alcohol, SBR latex, starch, polyacrylates and other binders well known in the related art. Other additives may be included in the coating to aid in dispersion, rheology and coating handling. These additives include, but are not limited to, defoamers, dispersants, wetting agents, conductive polymers, styrene malefic anhydride, thickeners, etc.

An insulating coating can be applied that is between 2 and 30 lbs/3300 $ft^2$, and more preferably between 5 and 15 lbs/3300 $ft^2$. A preferred thickness of the insulating coating is between 1 and 15 mils, most preferably between 3 and 10 mils.

U.S. Pat. Nos. 5,911,904 to Shih et al; 5,993,705 to Grischchenko et al.; and 6,085,970 to Sadlier, although directed toward distinct insulating container coatings and fabrication processes from that of the present invention, generally describe many of the manufacturing coating, heating and assembling processes that are commonly utilized in the paper cup/container stock art. The complete details of these coatings, heating and assembling processes are herein incorporated by reference in the present application.

The preferred embodiments depicted in the accompanying figures are directed toward the application of a foam layer 3 toward or along the interior surface of a container (e.g., beverage-side of the container). However, it will be appreciated by one of ordinary skill in the art that the foam layer 3 can be alternatively, or in combination with the PE film layer 4, applied along the exterior surface of the container.

The inventors of the present invention have discovered highly favorable, and heretofore unexpected, results when testing was conducted of the various preferred embodiments of the present invention. For example, a beverage container 10 constructed with a container wall 1 having the construction shown in FIG. 3 has demonstrated extraordinary hold times, moisture inhibition and resistance to vapor transmission. Further, the inventors of the present invention have demonstrated that hold times are significantly increased with the embodiment shown in FIG. 3 as compared to providing a moisture foam layer 3 blown on the outside surface of the paper stock 2, such as the PerfecTouch™ cup sold by Georgia Pacific™.

As aforementioned, a quantitative measurement of the ability of a paper stock to withstand heat transfer between the beverage containing space and the outermost surface of the container is often referred to as hold time. Accordingly, how long one can comfortably hold the hot container 10, e.g., hold time, is significantly reduced.

The preferred embodiment shown in FIG. 3 appears to best inhibit heat transfer to the paper stock 2, thereby reducing heat transfer by providing a moisture vapor transmission barrier at the innermost surface which prevents heating by mass transfer of that vapor through the cupstock. Hold times were significantly increased with the preferred embodiments of the present invention.

Figure 7:
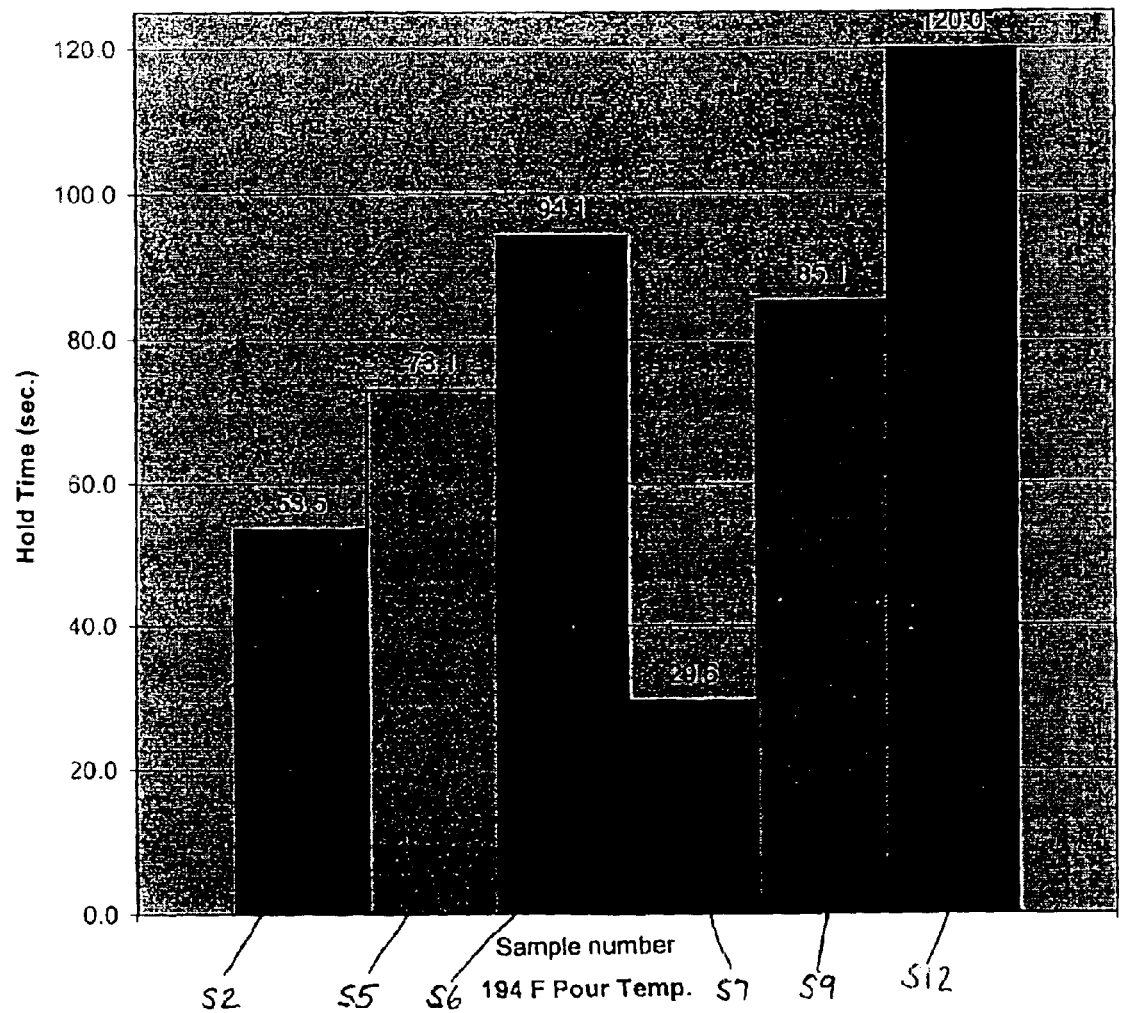
FIG. 7 is a graphical view of experimental data representing actual and comparative hold times for embodiments of the present invention and commercial available products.
Figure 8:
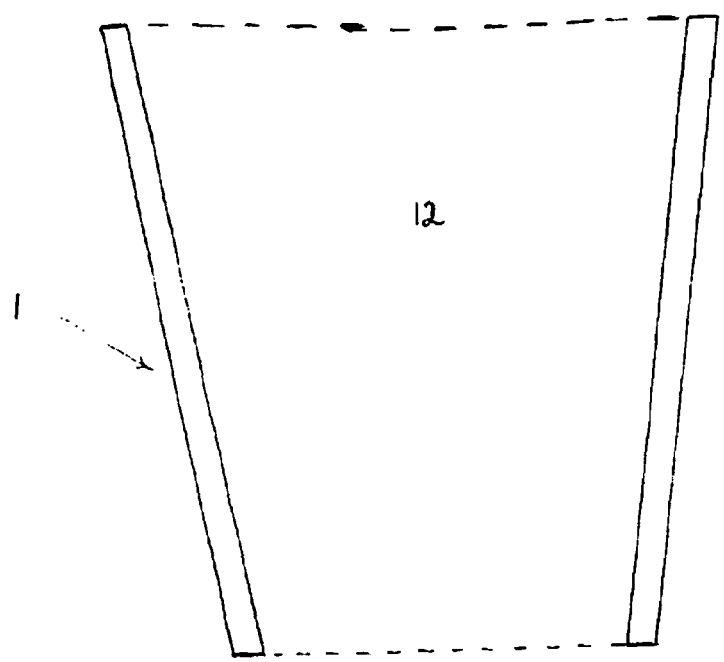
FIG. 8 is a cross sectional view of an insulating beverage container sleeve according to the present invention.

FIG. 7 is a graphical view of experimental data representing actual and comparative hold times for embodiments of the present invention and commercial available products and will be discussed further hereinafter. FIG. 8 is a cross sectional view of an insulating beverage container sleeve 12 according to the present invention. FIG. 8 is a cross-sectional view of an insulated beverage container wall 1 or beverage container sleeve wall 1 according to another embodiment of the present invention.

Figure 9:
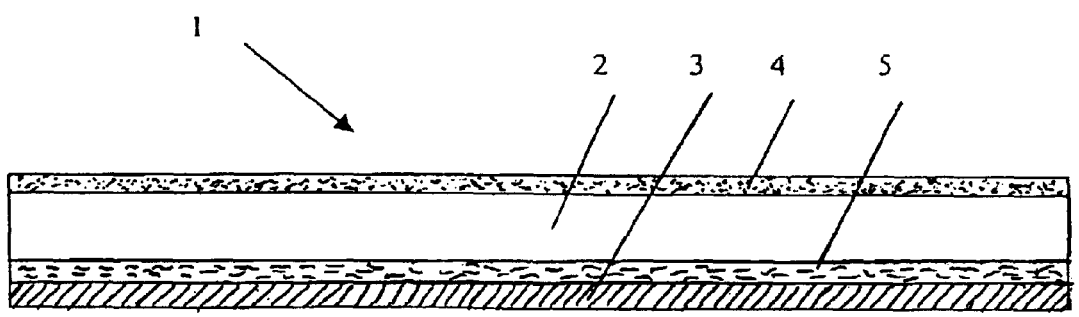
FIG. 9 is a cross-sectional view of an insulated beverage container wall or beverage container sleeve wall according to a fifth embodiment of the present invention.

It will be appreciated that an insulating beverage container sleeve 12 can readily incorporate any of the applicable embodiments of beverage container stock material (container wall) 1 shown in the accompanying drawings. An insulating beverage container sleeve 12 is often slipped over the outer surface of a beverage container such as that shown in FIG. 1. As seen in FIG. 9, an intermediate layer 5 may be provided between the paper stock 2 and foam layer 3. The intermediate layer 5 is applied to the paper stock as an extrusion, lamination, or coating. The purpose of the intermediate layer 5 is to adhere the gas containing film layer 3 to the paper stock 2.

However, the intermediate layer 5 can also be utilized as a barrier to moisture transmission and as an aid in seam sealing during sleeve construction. Typical materials used for intermediate layer 5 include, but are not limited to: high density polyethylene (HDPE), low density polyethylene (LDPE), linear low density polyethylene (LLDP), orientated polypropylene (OPP); and adhesives, such as hot melt adhesives, water based adhesives and solvent based adhesives, etc.

Additives known in the industry may be included to enhance certain properties or aid in processing and may include, but are not limited to: ethylene vinyl acetate (EVA), ethylene vinyl alcohol (EVOH), and plasticizers. Exterior layer 4 is applied to the paper stock to provide a surface which may have the following properties depending on end use, including but not limited to: materials accepting high quality graphics and printing inks, materials providing tactile feel, materials that change color with temperature, materials providing seam sealing capabilities, and materials providing a more secure gripping surface, etc. The sleeve 12 construction may be preferentially oriented with the foam material 3 toward the cup 11 surface and the paper surface 2, 4 facing outward, e.g., visible to the user. However, the sleeve construction can be inverted with the foam on the exterior and the paper surface(s) 2, 4 facing inwardly toward the cup/container 11 wall. A PE layer as aforementioned can also be applied (not shown in FIG. 9) along the interior surface of the container, e.g. between the foam layer 3 and the beverage containing space 11 when the embodiment of FIG. 9 is applied to a container 10.

FIG. 7 is a graphical view of experimental data representing actual and comparative hold times for embodiments of the present invention and commercial available products. FIG. 7 shows experimental hold times (measured in seconds) achieved for different samples. The various samples or beverage containers were filled with approximately 230 ml of water at approximately 90° C. (194° F. pour temperature).

In Table I, Sample S2 is a product/container sample having 15/15/15 pt. base stock/air w/corrugation/base stock. Sample S5, Sample S6, and Sample S7 are test samples of the present invention incorporating a container wall 1 with construction similar to that shown in FIG. 3. Sample S5 is a 10 pt foam 18 pt base paper laminate. S6 is a 20 point foam 18 pt base paper laminate. S7 is a 30 pt foam 18 pt base paper laminate. Sample S9 is a paper stock with a moisture blow polyethylene exterior such as the PerfecTouch™ container available from Fort James. Sample S12 is a laminate foam 18 pt base with 20 pt polyethylene foam.

Testing was conducted of different samples to determine average hold times after several iterations of testing. A control test person was used in many testing results to maintain data integrity. In alternative testing, several different control test persons were utilized.

Table I provides experimental test results of insulated cup hold time studies conducted at a pour temperature of 90° C. and with approximately 230 ml. of water. Table I is directed toward the test results of the various samples.

Anti-Wrinkling Effects

Paper stock-based laminates may suffer from wrinkling or creasing of the innermost layers of a final product after manufacture. For example, a beverage container 11 or sleeve 12 utilizing a foam layer 3 along the interior may experience a particularly problematic wrinkling effect. During a cup making process, blanks for cups are often die cut and then shaped around a cylindrical mandrel. Accordingly, the cup diameter will vary depending on the substrate thickness or caliper of each layer of the laminate, the number of layers and the type of materials utilized in each layer. Accordingly, the change in cup diameter, $\Delta D$, can be quantified according to the following relationship, wherein C is the substrate thickness or caliper, $\Delta D=2C$. However, as seen in FIG. 1, the diameter will also vary depending on where it is measured, e.g. the diameter along the upper side surface 7 is greater than that along the lower side surface 8.

TABLE I

Insulated Cup Hold Time Study Pour Temperature - 90° C.
All Cups contained 230 ml. H2O

| Hold Times in seconds | | | | | | |
|---|---|---|---|---|---|---|
| Sample Number | 2 | 5 | 6 | 7 | 9 | 12 |
| | Insulair ™ | 10 pt Foam 18 pt Base | CA-20 | CA-30 | Product Sample | 10 pt w/ 18 pt base |
| Caliper ½thousandths of an inch | | 32.5 | 37 | 43.5 | | 27.5 |
| Hold Times | | | | | | |
| Average: | 53.5 | 85.1 | 73.1 | 94.1 | 29.6 | 55.8 |
| minus ctrl: | 45.0 | 76.6 | 64.6 | 85.6 | 21.1 | 47.3 |
| minus Perf touch: | 23.9 | 55.5 | 43.4 | 64.5 | 0.0 | 26.1 |
| minus Insulair ™ | 0.0 | 31.6 | 19.6 | 40.6 | −23.9 | 2.3 |

Accordingly, the thicker the substrate, the greater the difference between the innermost and outermost diameters. Since both surfaces of the substrate start out at the same length, the difference in diameter creates a system that is under stress. The cup forming substrate, such as a paper stock 2, has a relatively large caliper. A foam layer 3 along the interior surface is relatively soft and pliable. Therefore, the foam properties along the interior surface, coupled with the change in diameter, cause wrinkles to form under the stress (with less ability to withstand the stress) of conforming to a relatively smaller diameter.

The cross-section shown in FIG. 3 is exemplary of a container 10 having a PE layer 4, wherein the foam layer 3 is sandwiched in between the paper stock layer 2 and the PE layer 4. The cross-section shown in FIG. 4 is exemplary of an insulating foam layer 3 adhered to the paperboard stock layer 2 by a PE layer 4 that may exhibit the aforementioned wrinkling effect. As seen in FIG. 5, another embodiment includes at least two PE layers 4, wherein an inner surface of the container employing this cross section will also have a PE layer 4 closest to the beverage container space 11.

Figure 10:
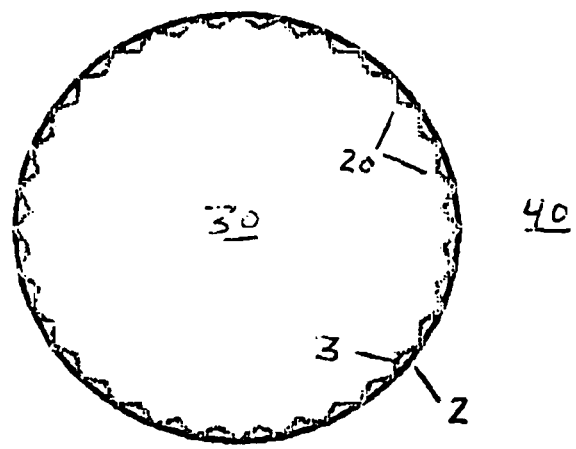
FIG. 10 is a plan view depicting an interior and exterior of a beverage container or sleeve wall according to the present invention.
Figure 11:
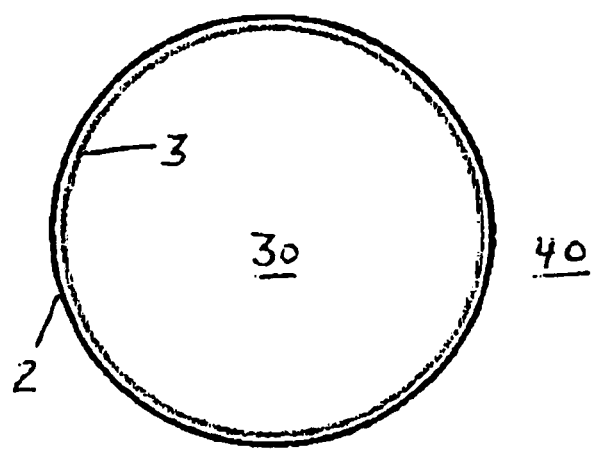
FIG. 11 is a plan view depicting an interior and exterior of a beverage container or sleeve wall according to the present invention.

FIG. 10 is a plan view depicting an interior and exterior of a beverage container or sleeve wall according to another embodiment of the present invention. FIG. 11 is a plan view depicting an interior and exterior of a beverage container or sleeve wall according to another embodiment of the present invention. These wrinkles 20 or creases become undesirable and problematic in the finished cup or sleeve. The folds in the wrinkles 20 tend to trap the beverage in the cup causing staining and/or loss of product. The wrinkling effect also detracts from the aesthetic value of the finished product.

FIGS. 10–11 are also directed toward a method of making a beverage container or sleeve that eliminates or substantially reduces the amount of wrinkling occurring along a container's interior 30. FIGS. 10 and 11 depict the interior cup surface 30 and exterior cup surface 40 of a container before and after heating and shrinking the polymer shrink film layer (PE layer) 4, respectively, according to an embodiment of the present invention. In FIG. 10 the foam layer 3 has wrinkled under the stresses of conforming to a smaller diameter. After being subjected to a heating process, the foam shrinks, producing a taut, smooth layer as shown in FIG. 11.

During high speed cup forming, die cut paper may be wrapped around a mandrel to form the container cylinder. Due to the relative change in diameter, the inner surface 30 is now under stress. By choosing a foam layer 3 that has shrink properties, the wrinkles can be removed through the application of heat. A formed cup with a wrinkled interior can be exposed to heat, causing the foam to shrink and remove the wrinkles 20. As long as sufficient heat is applied to smooth out the wrinkles while not overheating the film to cause degradation, the specific details of the heat application method are not critical. In an ideal embodiment, the heating method and/or equipment can be incorporated into existing cup making equipment.

The heating process can include localized heating or shrinking processes, e.g., only the interior surface is subjected to a heating process, such as heated process air being passed exclusively along the interior surface 30. However, one of skill in the art will appreciate that the entire container or various ratios of controlled heating may be employed, e.g., interior surface heating rate to exterior surface heating rate being increased so that an interior to exterior ratio is generally higher than 1:1.

The elimination of wrinkles 20 can be accomplished with any combination of heating and/or the incorporation of polymers for the foam layer 3 and polymer shrink film layer 4 having desirable heat shrink properties. The air used to transport and stack the finished cups can be heating, the forming mandrels can be heated, the cup can be transported through a tunnel heater or other heating device, and/or a heated air stream can be passed across the cup's interior surface 30.

Shrink films can be made out of a wide range of commercially available polymers. Table II lists some applicable shrink-films commercially available in the United States. However, one of skill in the art will appreciate that other commercially available films are available or are currently being developed. Accordingly, any shrink film having desirable shrink film properties for the present invention is within the spirit and scope of the present invention. The polymers chosen and the polymer processing history are two major factors influencing the foam shrink properties. The polymer type and processing method should be selected to create the amount of shrinkage necessary while maintaining foam integrity. *The Wiley Encyclopedia of Packaging Technology*, Second Edition, Aaron L. Brody and Kenneth S. Marsh, John Wiley and Sons, 1997, describes additional examples of suitable shrink films and their related properties, the entirety of which is hereby incorporated by reference.

TABLE II

Commercially Available Shrink Films

| Shrink Film | Polymer Type | Commercial Product |
| --- | --- | --- |
| Polyethylene Monolayer | Polyolefins | DuPont Clysar HP, LLP; and Cryovac D601 |
| Polyethylene Multilayer | Polyolefins | Cryovac D955, D940, RD106, D959 |
| Polypropylene/monolayer ethylene--ropylene copolymer | Polyolefins | DuPont Clysar EHC, CHS, RSW; Okura Vanguard 100; and Gunze PSS |
| PP/EPC Multilayer | Polyolefins | Cryovac MPD2055, MPD2100, J960, J961; Okura Vanguard 501; Intertape Exlfilm IP-83; and Dupont Clysar EZ |
| Biaxially Oriented | Polyvinyl Chloride (PVC) | Reynolds Reynolon 1044, 2044, 3044, 4044, 5044; Allied Krystaltite T111, T122, T133, T144, T15, R11, R22, R44, and Gunze Fancywrap |
| Preferentially Oriented | Polyvinyl Chloride (PVC) | Reynolds Reynolon 3023, 4061, 5032, 7052; and Allied Krystaltite PT152 |
| Aroma and Oxygen Barrier | Specialty Films | Cryovac BDF2001, BDF2050 |
| Moisture Barrier | Specialty Films | Cryovac BDF1000 |
| Moisture, Gas and Aroma Barrier | Specialty Films | Cryovac BDF3000 |

Preferred shrink films for the present invention, particularly polyethylene and/or modified polyethylene films, are determined by their properties and cost. Specific examples of shrink films for the foam layer 3 of the present invention are high density polyethylene or blends of HDPE and linear low density polyethylene (LLDPE), e.g., not more than 30% by weight. The shrink films are created by stretching the warm film and keeping it under tension while cooling. The polymer chains are then locked into a stressed state. Upon being subjected to a heating process near the melting point of the shrink film, the chains relax and the film shrinks.

In a preferred embodiment, required "percent shrink" is low relative to shrink films commercially marketed under this category. Typical shrink films will shrink on the order of 70–80% if unrestrained. The present inventors have determined that too much shrinkage of the foam layer 3 will cause the film to pull away from the container wall 11 and/or delaminate. Further, too much shrinkage will result in undesired interior cup space loss and reduced stacking efficiencies. The present inventors have determined that a foam layer 3 having a percent shrink of between 0–30%, and more preferably a percent shrink of 5–10%, will create the best results. Films with higher shrinkage rates may be used if additional considerations are taken to control the shrinkage of the container, such as controlling shrinkage through the use of an inserted mandrel or other physically limiting device.

The shrink initiation temperature is another key attribute of a preferred shrink film. A shrink film can be designed to shrink at 190° F., such as when hot coffee is poured into a container thereby causing wrinkles 20 to be pulled or smoothed out under tension. In addition, a shrink film can be selected that shrinks at a temperature well above 190° F., such as during a relatively high manufacturing process temperature so that wrinkles are removed prior to the actual use of the container. If the initiation temperature is low, the total amount of shrinkage must also be low. For example, if the initiation temperature is 190° F., and 200° F. coffee is poured into the cup, the shrinkage must be low to avoid cup volume loss and expulsion of hot coffee as the volume decreases.

A method of producing an insulated container may include the steps of providing a paper cupstock having a container wall 1 for surrounding an interior space 11, a bottom portion 9, and a paper stock layer 2 arranged along an exterior surface 40 of the container wall 1; mixing a blowing agent into a foamable polymer layer 3; forming a foam layer 3 along an inside surface 30 of the interior space 11; adhering a polymer shrink film layer 4, e.g., PE layer 4, to the foam layer 3; and heat treating the container to shrink the polymer shrink film layer between a percent shrink range of 30% or less. The foam layer 3 is adhered to the paper cupstock 2, either directly or indirectly through another intermediate layer 5, e.g. such as an additional PE layer 4.

The aforementioned method of producing an insulated food or beverage container or sleeve, may also include the steps of providing an insulated container or sleeve having an interior space 11, the interior space 11 including a polymer shrink film layer 4 and a foam layer 4 along an interior surface 30 thereof. The interior surface 30 is heated to shrink the polymer shrink film layer 20 and remove wrinkles along the foam layer(s) 3 and polymer shrink film layer(s) 4 during the heating step to thereby prevent an undesirable wrinkling effect in the interior space 30.

The heat treatment process is employed either during the manufacturing process or during product use, e.g., hot cup of coffee produces desired shrinkage for shrinking the foam layer to remove wrinkles at a percent shrink range of 30% or less. The heat treatment process may also be any conventional heat treatment process for shrinking polymer shrink films available in the related art. This includes both heating and cooling processes, including combinations thereof. *The Wiley Encyclopedia of Packaging Technology*, Second Edition, Aaron L. Brody and Kenneth S. Marsh, John Wiley and Sons, 1997, describes specific examples of heat treatment processes for implementing shrink films, the entirety of which is hereby incorporated by reference. Specifically, the present invention may utilize conventional heat treatment processes such as a tenter-frame process, a bubble process, combinations thereof and/or their equivalents.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An insulated container stock material comprising:
   an interior surface and an exterior surface;
   a paper stock layer, wherein said paper stock layer forms said exterior surface;
   a foam layer, wherein said foam layer is heat laminated foam formed from at least one of high density polyethylene, low density polyethylene, linear low density polyethylene, and oriented polypropylene; and
   a polymer barrier shrink film layer having a percent shrink of 5–30%, wherein said heat laminated foam layer and said polymer shrink film layer form said interior surface.

2. The insulated container stock material according to claim 1, further comprising an additional polymer film layer, said foam layer being sandwiched between said additional polymer film layer and said polymer shrink film layer.

3. The insulated container stock material according to claim 1, said foam layer being sandwiched between said paper stock layer and said polymer shrink film layer.

4. The insulated container stock material according to claim 1, wherein said paper stock material has a thickness greater than or equal to 10 mils and less than or equal to 26 mils, wherein the stock material is for a food or beverage container.

5. The insulated container stock material according to claim 4, wherein said foam layer is adhered to said paper stock layer by melt extrusion, lamination or foam extrusion.

6. The insulated container stock material according to claim 1, wherein said foam layer is a shrink film foam.

7. The insulated container stock material according to claim 1, wherein said polymer shrink film layer is a laminated or extruded shrink film polymer formed from at least one of high density polyethylene, low density polyethylene, linear low density polyethylene, and oriented polypropylene.

8. The insulated container stock material according to claim 7, wherein said percent shrink of said polymer shrink film layer is between a range of approximately 5 to 10%.

9. The insulated container stock material according to claim 1, wherein said percent shrink of said polymer shrink film layer is between a range of approximately 5 to 10%.

10. An insulated container comprising:
    a container wall having an exterior surface and an interior surface;
    a bottom portion engaging said container wall along a lower side portion thereof;
    a paper stock layer arranged along the exterior surface of said container wall;
    a foam layer, wherein said foam layer is heat laminated foam formed from at least one of high density polyethylene, low density polyethylene, linear low density polyethylene, and oriented polypropylene; and
    a polymer barrier shrink film layer having a percent shrink of 5–30%, wherein said heat laminated foam layer and said polymer shrink film layer form an interior surface of the container wall.

11. An insulated container comprising:
    a container wall having an exterior surface and an interior surface;
    a bottom portion engaging said container wall along a lower side portion thereof;
    a paper stock layer arranged along the exterior surface of said container wall;
    a foam layer, wherein said foam layer is heat laminated foam formed from at least one of high density polyethylene, low density polyethylene, linear low density polyethylene, and oriented polypropylene; and
    a polymer barrier shrink film layer, said heat laminated foam layer being sandwiched between said polymer shrink film and said paper stock layer having a percent shrink of 5–30%, wherein said heat laminated foam layer and said polymer shrink film layer form said interior surface of said container wall.

12. The insulated container according to claim 11, wherein said polymer shrink film layer is a laminated, melted or extruded polymer having a percent shrink of 30% or less and formed from at least one of high density polyethylene, low density polyethylene, linear low density polyethylene, and oriented polypropylene.

13. The insulated container according to claim 12, wherein said percent shrink of said polymer shrink film layer is between a range of approximately 5 to 10%.

14. The insulated container according to claim 12, further comprising an additional polymer film layer sandwiched between said foam layer and said paper stock layer.

15. The insulated container according to claim 11, further comprising an insulating coating sandwiched between said foam layer and said paper stock layer and wherein the container stock is for a food or beverage container.

16. The insulated container according to claim 11, wherein said foam layer is a laminated, melted or extruded foam polymer formed from at least one of high density polyethylene, low density polyethylene, linear low density polyethylene, and oriented polypropylene.

17. An insulated food or beverage container sleeve comprising:

an interior surface and a exterior surface;

a paper stock layer forming said exterior surface;

a foam layer, wherein said foam layer is heat laminated foam formed from at least one of high density polyethylene, low density polyethylene, linear low density polyethylene, and oriented polypropylene; and a polymer barrier shrink film layer having a percent shrink of 5–30%, said foam layer being sandwiched between said paper stock layer and said polymer shrink film layer, wherein said heat laminated foam layer and said polymer shrink film layer form said interior surface.

18. The insulated food or beverage container sleeve according to claim 17, further comprising an additional polymer film layer sandwiched between said paper stock layer and said foam layer.

19. The insulated food or beverage container sleeve according to claim 17, wherein said polymer shrink film layer is a laminated or extruded polymer formed from high density polyethylene, low density polyethylene, linear low density polyethylene, or oriented polypropylene.

20. The insulated food or beverage container sleeve according to claim 17, wherein said foam layer is adhered to said paper stock layer by melt extrusion, lamination or foam extrusion.

* * * * *